(12) United States Patent
Sakata et al.

(10) Patent No.: US 9,037,690 B2
(45) Date of Patent: *May 19, 2015

(54) DISCRETE MAPPING FOR TARGETED CACHING

(71) Applicant: Edgecast Networks, Inc., Santa Monica, CA (US)

(72) Inventors: Jayson G. Sakata, Encino, CA (US); Andrew Lientz, Bellevue, WA (US); Alexander A. Kazerani, Santa Monica, CA (US)

(73) Assignee: EDGECAST NETWORKS, INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/895,164

(22) Filed: May 15, 2013

(65) Prior Publication Data

US 2013/0268616 A1  Oct. 10, 2013

Related U.S. Application Data

(63) Continuation of application No. 12/947,749, filed on Nov. 16, 2010, now Pat. No. 8,468,222.

(51) Int. Cl.
*G06F 15/177* (2006.01)
*G06F 15/167* (2006.01)
*H04L 29/12* (2006.01)
*H04L 29/08* (2006.01)

(52) U.S. Cl.
CPC .......... *G06F 15/167* (2013.01); *H04L 61/1511* (2013.01); *H04L 67/2842* (2013.01)

(58) Field of Classification Search
USPC .......... 709/220–221, 227, 229, 245
See application file for complete search history.

(56) References Cited

U.S. PATENT DOCUMENTS

| | | | |
|---|---|---|---|
| 6,108,703 A | 8/2000 | Leighton et al. | |
| 6,553,413 B1 | 4/2003 | Leighton et al. | |
| 6,976,090 B2 * | 12/2005 | Ben-Shaul et al. | 709/246 |
| 7,010,578 B1 | 3/2006 | Lewin et al. | |
| 7,103,645 B2 | 9/2006 | Leighton et al. | |
| 7,293,093 B2 | 11/2007 | Leighton et al. | |
| 7,693,959 B2 | 4/2010 | Leighton et al. | |
| 8,392,912 B2 * | 3/2013 | Davis et al. | 717/177 |
| 2007/0283419 A1 * | 12/2007 | Afergan et al. | 726/3 |
| 2008/0235400 A1 * | 9/2008 | Slocombe et al. | 709/245 |
| 2009/0172192 A1 | 7/2009 | Christian et al. | |
| 2010/0023693 A1 * | 1/2010 | Dilley et al. | 711/118 |
| 2011/0078327 A1 * | 3/2011 | Li et al. | 709/238 |
| 2012/0117458 A1 * | 5/2012 | Holloway et al. | 715/234 |

\* cited by examiner

*Primary Examiner* — Liangche A Wang
*Assistant Examiner* — Cheikh Ndiaye

(57) ABSTRACT

Some embodiments provide systems and methods for implementing discrete mapping for targeted caching in a carrier network. In some embodiments, discrete mapping is implemented using a method that caches content from a content provider to a caching server. The method modifies a DNS entry at a particular DNS server to resolve a request that identifies either a hostname or a domain for the content provider to an address of the caching server so that the requested content is passed from the cached content of the caching server and not the source content provider. In some embodiments, the particular DNS server is a recursive DNS server, a local DNS server of the carrier network, or a DNS server that is not authoritative for the hostname or domain of the content provider.

14 Claims, 9 Drawing Sheets

```
; BIND data file for video streaming content provider
;
$TTL  300
@ IN  SOA sjl-ins1.sjl.videoprovider.com. dns-admin.videoprovider.com. (
       1431915    ; Serial
       900        ; Refresh
       900        ; Retry
       1800       ; Expire
       60 )       ; Negative Cache TTL

@   300   IN  A   72.21.81.133
```

```
; BIND data file for audio streaming content provider
;
$TTL  300
@ IN  SOA ax.s1.audioprovider.com. dns-admin.audioprovider.com. (
       1431915    ; Serial
       900        ; Refresh
       900        ; Retry
       1800       ; Expire
       60 )       ; Negative Cache TTL

DISCRETE MAPPING FOR TARGETED CACHING

CLAIM OF BENEFIT TO RELATED APPLICATIONS

This application is a continuation of U.S. non-provisional application Ser. No. 12/947,749, entitled "Discrete Mapping for Targeted Caching", filed Nov. 16, 2010. The contents of application Ser. No. 12/947,749 are hereby incorporated by reference.

TECHNICAL FIELD

The present invention relates to systems and methods for caching in a carrier network.

BACKGROUND ART

Much of the digital content that end users send and receive passes through various data networks that collectively form the Internet. End users gain access to these data networks through one or more carrier networks. Carrier networks include internet service providers (ISPs) that provide wired broadband connectivity (e.g., Digital Subscriber Line (DSL), cable, and fiber optic) through which end users access the Internet while at home or at the office. Carrier networks also include wireless service providers such as AT&T, Verizon, Sprint, and T-Mobile that provide wireless access to the Internet.

Data that passes through the carrier network between its end user subscribers and any external data networks imposes costs on the carrier network. These costs materialize in the form of (i) network costs for the bandwidth that is needed to send and receive data from the external data networks and (ii) infrastructure costs for equipment to interwork and transfer the data from the carrier network to the external data networks. To minimize these costs, carrier networks have utilized various caching implementations within their own networks. Such caching is intended to fulfill end user content requests by localizing traffic within the carrier network thereby reducing the amount of traffic that is exchanged between the carrier network and the external data networks. The reduced traffic results in lower overall network costs and infrastructure costs for the carrier network.

One such caching implementation that is widely used by carrier networks is transparent caching. FIG. 1 illustrates transparent caching within a carrier network. As shown, the carrier network includes multiple service regions 110, gateway 120, and transparent caching server 130. End user devices communicably couple to the service regions 110 in order to access data services of the carrier network. End user devices include smartphones, tablets, laptops, and other electronic devices with network connectivity. The service regions 110 include wired points of access and/or wireless service regions. The gateway 120 performs end user authentication, authorization, interworking, and other functionality to enable users to send data to and receive data from the external data network 140 (e.g., the Internet). All end user data therefore passes through the gateway 120 before being passed to the external data network 140. Some carrier networks include multiple gateways where each gateway services a set of service regions. It should be apparent that the description for the gateway is simplified for illustrative purposes. A gateway is composed of multiple components that each perform various functionality. For example, a gateway for a wireless carrier network may include a Mobile Switching Center (MSC), a Serving GPRS Support Node (SGSN), a Gateway GPRS Support Node (GGSN), and various databases including a Home Location Register (HLR).

The transparent caching server 130 intercepts all data passing from the gateway 120 to the external data network 140. The operation of the caching server 130 is transparent because no modifications have to be made to the gateway 120 or the external data network 140 in order to integrate and utilize the functionality that is provided by the caching server 130. The caching server 130 processes the data passing from the gateway 120 to identify content requests. The caching server 130 determines whether the requested content is cached within a local storage memory of the caching server 130. If so, the requested content is passed from the cache to the gateway 120 without the need to access the external data network 140. Otherwise, the request is passed through to the external data network 140 where it is routed to the source content provider. The source content provider hosts the requested content and passes the requested content to the requesting end user. As the requested content is passed from the external data network 140 through the gateway 120 to the requesting end user, the caching server 130 updates its cache with the most frequently requested content.

Transparent caching and other similar caching implementations have several shortcomings. Firstly, operation of the transparent caching server is resource intensive. The transparent caching server includes sufficient processing, memory, and network resources to intercept and process all data traffic that passes from the gateway to the external data network without creating a bottleneck or otherwise introducing delay in the operation of the carrier network. As a result, current transparent caching servers are expensive to deploy in a large carrier network. Secondly, the operation of the transparent caching server is inefficient as content for a small portion of the identified content requests is available within the transparent server cache. This results in a large number of cache misses and large amounts of data that is processed by the transparent caching server without yielding any benefit to the carrier network. Thirdly, transparent caching may fail to cache content that would result in the most cost savings to the carrier network. For example, certain video streams can consume disproportionate amounts of bandwidth, but these video streams may not be cached by the caching server when they are not requested as frequently as other content that consume less bandwidth. Fourthly, transparent caching may be slow to adapt to changing traffic patterns. For example, the carrier network may anticipate that an upcoming event will be highly desired. However, until the content for the highly desired event is requested a sufficient number of times, the caching server will not store that content to cache.

Therefore, there is a need to provide more efficient caching within the carrier network. There is also a need to reduce the implementation costs for such caching.

SUMMARY OF THE INVENTION

Some embodiments provide systems and methods for implementing discrete mapping for targeted caching in a carrier network. In some embodiments, discrete mapping involves mapping a specified set of end user content requests to a targeted caching server of the carrier network. The targeted caching server caches the content for the specified set of end user content requests.

Targeted caching for the carrier network is implemented by modifying resources of the carrier network to discretely map end user requests for targeted cached content to the targeted caching server. The discrete mapping is performed using Domain Name System (DNS) servers that are used by the carrier network. These DNS servers include recursive DNS servers of the carrier network, local DNS servers of the carrier network, and DNS servers that are not authoritative for the hostnames or domains of the source content providers that host the targeted cached content. In some embodiments, the DNS servers are modified to map a specified set of content requests to the targeted caching server instead of to the source content providers. The discrete mapping may also be used to provide parental controls whereby end user content requests for illicit, lewd, or other unapproved content are restricted.

To modify the DNS operation, some embodiments provide a periodic feed that updates the entries of the carrier network DNS servers. Some embodiments provide an Extensible Markup Language (XML) file, provide a delimited file, provide a DNS zone file, or perform a DNS zone transfer in order to update the DNS entries of the DNS servers.

In some embodiments, the DNS operation for the carrier network is modified by partially or wholly assigning the DNS operation to the caching service operator. The assignment allows the caching service operator to manage the DNS operation for the hostnames and/or domains from which content is cached. As a result, the caching service operator can perform DNS updates directly to the DNS servers as needed.

In some embodiments, the DNS operation for the carrier network is modified by complimenting the carrier network DNS servers with DNS servers that are operated by the caching service operator. In some such embodiments, DNS requests for a specified set of hostnames and/or domains are redirected from the carrier network DNS servers to the DNS servers of the caching service operator. The redirection allows the caching service operator to manage the DNS operation for the hostnames and/or domains from which content is cached, thereby allowing the caching service operator to perform DNS updates directly to its DNS servers as needed.

BRIEF DESCRIPTION OF THE DRAWINGS

In order to achieve a better understanding of the nature of the present invention, a preferred embodiment for targeted caching will now be described, by way of example only, with reference to the accompanying drawings in which:

FIG. 4 illustrates entries of two DNS zone files for performing discrete mapping in accordance with some embodiments.

DETAILED DESCRIPTION

In the following detailed description, numerous details, examples, and embodiments for targeted caching for a carrier network is set forth and described. It will be clear and apparent to one skilled in the art that the targeted caching is not limited to the embodiments set forth and that the targeted caching may be practiced without some of the specific details and examples discussed.

I. Overview

To provide more efficient caching in a carrier network, some embodiments provide systems and methods for implementing discrete mapping for targeted caching. In some embodiments, discrete mapping involves mapping a specified set of end user content requests to a targeted caching server of the carrier network. The targeted caching server caches the content for the specified set of end user content requests. The cached content is selected to provide the greatest cost savings to the carrier network or the best monetization of the carrier network resources irrespective of the popularity of such content or how often the content is requested by end users.

The discrete mapping reduces or altogether eliminates cache misses at the targeted caching server. The targeted caching server is thereby freed from having to perform resource intensive processing of end user content requests in order to determine whether the requested content is cached at the caching server. Also, discrete mapping reduces the processing performed at the targeted caching server in order to determine what content is cached. As a result, the targeted caching server can be implemented with fewer resources and with lower overall cost to the carrier network.

Figure 1:
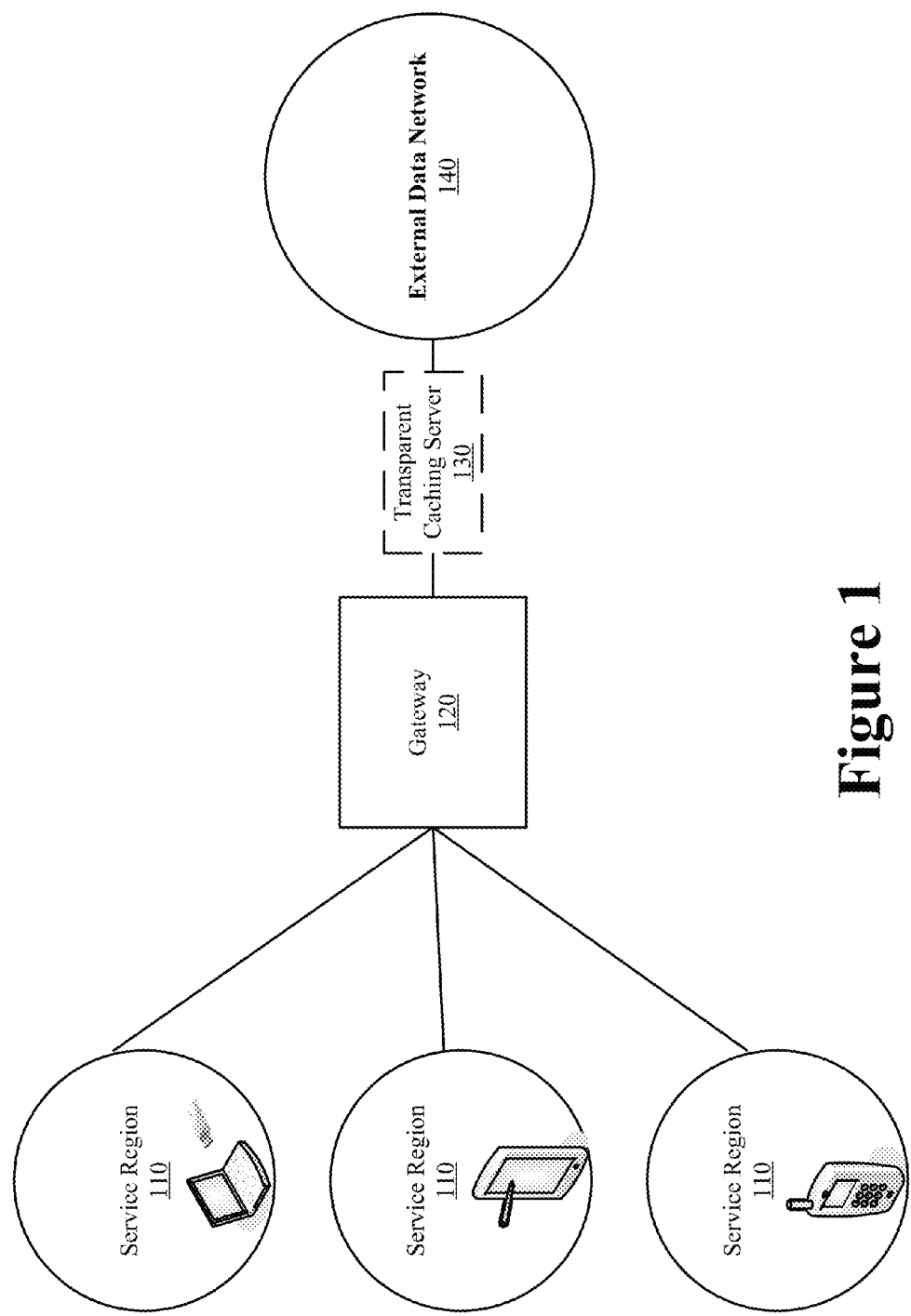
FIG. 1 illustrates transparent caching within a carrier network.
Figure 2:
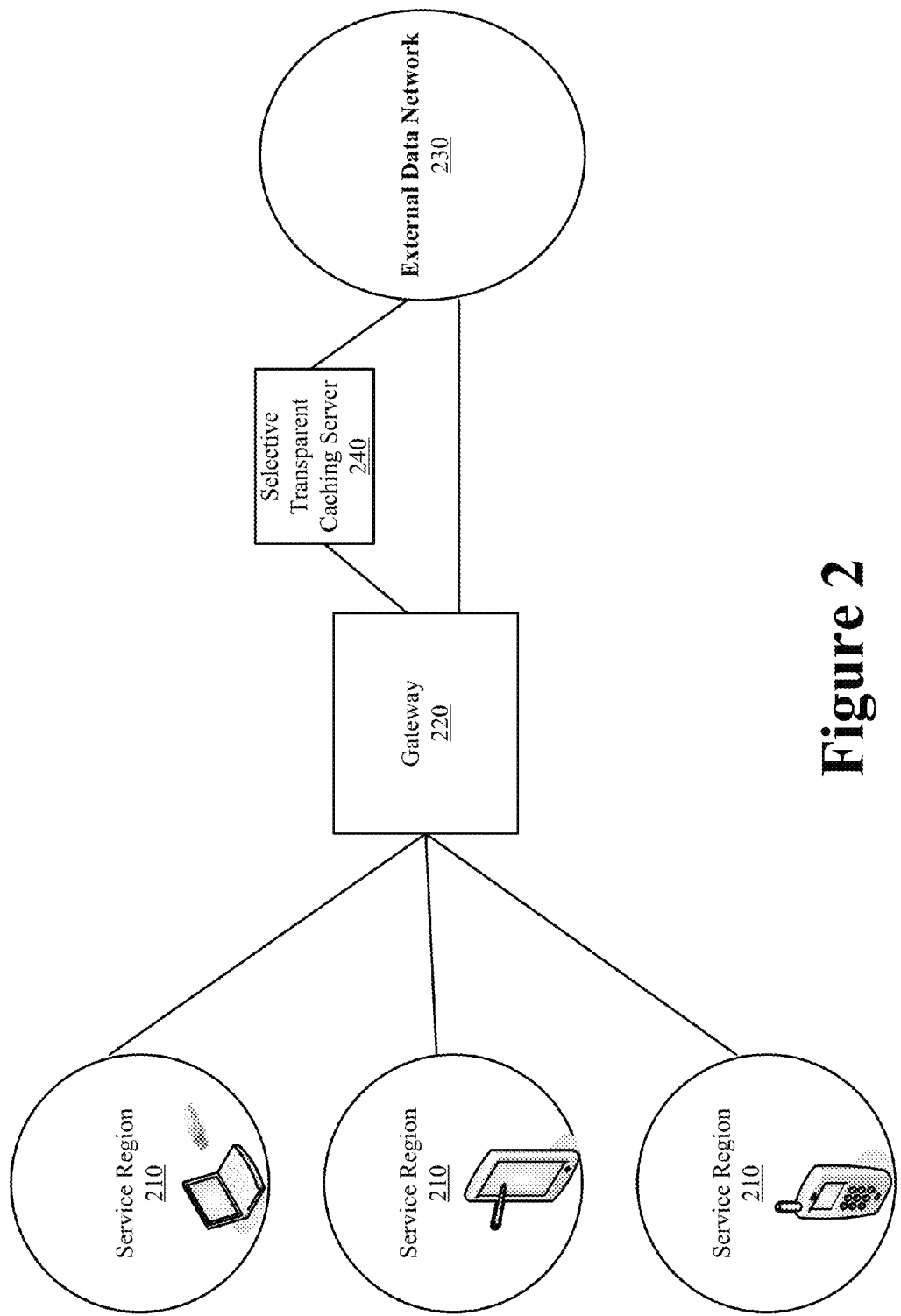
FIG. 2 presents a carrier network that implements targeted caching in accordance with some embodiments.

FIG. 2 presents a carrier network that implements targeted caching in accordance with some embodiments. As shown, the carrier network includes multiple service regions 210, gateway 220, and targeted caching server 240. The gateway 220 performs the core carrier network functionality that includes allowing end user subscribers that are located in a service region 210 to access data from the external data network 230.

Targeted caching for the carrier network is implemented by modifying resources of the carrier network to discretely map end user requests for targeted cached content to the targeted caching server 240. The discrete mapping is performed using Domain Name System (DNS) servers that are used by the carrier network. In some embodiments, these DNS servers are part of the gateway 220 and are under the control of the carrier network. The DNS servers operate to resolve addressing for content requests that originate from the service regions 210. In some embodiments, the DNS servers are modified to map a specified set of content requests to the targeted caching server 240 instead of to the source content providers. The specified set of content requests specifies hostnames or domains from which content is selected for caching at the targeted caching server 240. In some embodiments, the modified DNS servers include recursive DNS servers of the carrier network that are not authoritative for the one or more zones, hostnames, or domains from which content is cached to the targeted caching server 240. In some embodiments, the discrete mapping is used to provide parental controls whereby end user content requests for illicit, lewd, or other unapproved content are restricted.

The targeted caching implementation of some embodiments is typically not viable in the Internet due to security restrictions that prevent unauthorized DNS modification and because of the distributed and decentralized nature of the DNS hierarchy across the Internet. Specifically, targeted caching in the Internet would require accessing and modifying authoritative DNS servers for those zones, hostnames, or domains from which content is cached at the targeted caching servers. However, targeted caching can be implemented in the carrier network by modifying the DNS servers of the carrier network that are under the control of the carrier network. All DNS requests that originate from the carrier network service regions first pass through the local DNS servers of the carrier network. The carrier network can permit modifications to these servers such that end user submitted requests that identify zones, hostnames, or domains from which content is cached to the targeted caching servers are discretely mapped to the targeted caching servers instead of to the source content providers. These modifications can be made without accessing or modifying the authoritative DNS servers of the targeted zones, hostnames, or domains. In some embodiments, modifications to the DNS operation of the carrier network originate from a carrier network administrator, a third party operator such as a caching service operator, or from the targeted caching server 240. In some embodiments, the targeted caching server 240 is operated by the carrier network or a caching service operator such as a Content Delivery Network (CDN).

As noted above, the targeted caching server 240 caches targeted content from a selected set of content providers. In some embodiments, the cached content that is targeted is selected to provide the greatest resource savings and cost savings to the carrier network. For example, the cached content includes streaming video content and streaming audio content that consumes large amounts of bandwidth and the delivery of which is time-sensitive. In some embodiments, the cached content that is targeted is selected to include content from any content provider that is certified by the carrier network or caching service operator. In some embodiments, the cached content that is targeted is selected to best monetize the caching resources by caching content from content providers that pay to have their content cached at the targeted caching server 240.

FIG. 2 illustrates the targeted caching server 240 as separate from the gateway 220. However, in some embodiments, the targeted caching server 240 is integrated as part of the gateway 220. This allows the targeted caching server to be strategically placed adjacent to a set of service regions of the carrier network. In so doing, cached content can be delivered to end users that operate in the set of service regions with fewer network delays and network errors than when delivering the same content from a source content provider that is located in the external data network 230. As a result, the delivery of the cached content improves the end user experience for time sensitive content such as streaming video and streaming audio. The carrier network also benefits as traffic is localized within the carrier network. Localizing traffic reduces external data network bandwidth consumption.

In some embodiments, the carrier network includes multiple targeted caching servers that are distributed throughout the carrier network. Each caching server may service one or more service regions of the carrier network. A targeted caching server includes a processor, memory comprised of a computer readable storage medium, and network connectivity. Each targeted caching server may be a virtual machine, a single physical computing machine, or a grouping of machines that collectively operate to perform the targeted caching.

II. Discrete Mapping

The DNS operation of the carrier network is modified to discretely map to the targeted caching server those content requests for which content is cached at the targeted caching server. To modify the DNS operation, some embodiments provide a periodic feed that updates the entries of the carrier network DNS servers. As noted above, in some embodiments, the carrier network DNS servers include (i) recursive DNS servers, (ii) DNS servers that are not authoritative for the zones, hostnames, or domains from which targeted content is cached, or (iii) local DNS servers of the carrier network. Some embodiments provide an XML file, provide a delimited file, provide a DNS zone file, or perform a DNS zone transfer in order to update the DNS entries of the carrier network DNS servers.

In some embodiments, the DNS operation for the carrier network is modified by partially or wholly assigning the DNS operation to the caching service operator. The assignment allows the caching service operator to manage the DNS operation for the hostnames and/or domains from which content is cached. As a result, the caching service operator can perform DNS updates directly to the DNS servers as needed.

In some embodiments, the DNS operation for the carrier network is modified by complimenting the carrier network DNS servers with DNS servers that are operated by the caching service operator. In some such embodiments, DNS requests for a specified set of hostnames and/or domains are redirected from the carrier network DNS servers to the DNS servers of the caching service operator. As above, the redirection allows the caching service operator to manage the DNS operation for the hostnames and/or domains from which content is cached, thereby allowing the caching service operator to perform DNS updates directly to its DNS servers as needed.

A. DNS Updating

Some embodiments modify the DNS operation of the carrier network by providing a periodic feed that updates the DNS entries to discretely map end user requests for a specified set of hostnames and/or domains to the targeted caching server. In some embodiments, the targeted caching server automatically generates and issues the dynamic feed to the DNS servers. In some embodiments, the updates are automatically generated and issued by a feed generation server. The feed generation server may be operated by the caching service operator or the carrier network in order to centrally distribute the feed to multiple DNS servers. In some embodiments, the updates are manually generated and issued by a carrier network administrator or a mapping server that is operated by the carrier network.

Figure 3:
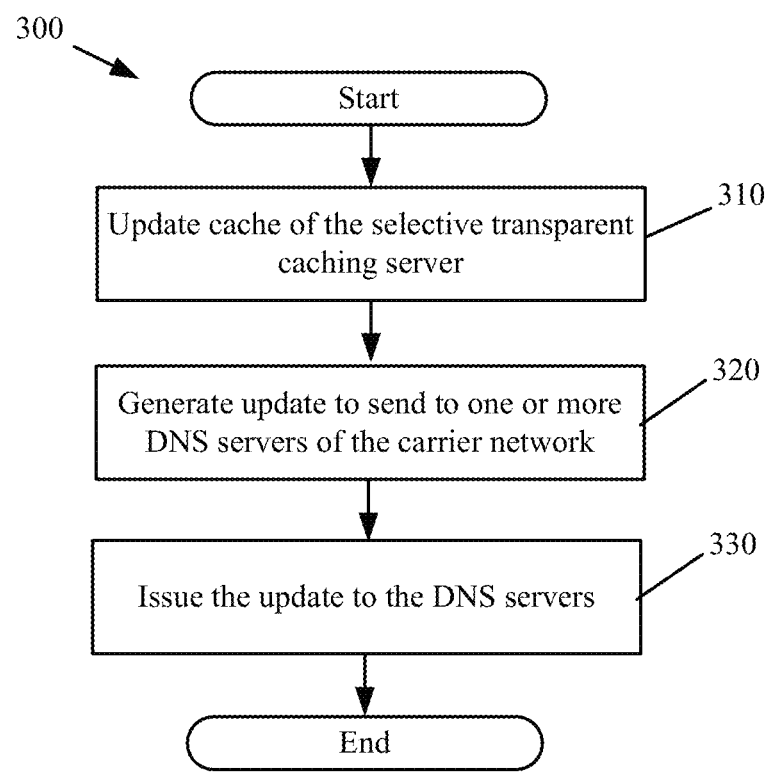
FIG. 3 presents a process that is performed by a targeted caching server to automatically update DNS operation for discrete mapping in accordance with some embodiments.

FIG. 3 presents a process 300 that is performed by a targeted caching server to automatically update DNS operation for discrete mapping in accordance with some embodiments. The process 300 is periodically performed to provide the carrier network DNS servers with the discrete mapping for content that is newly cached to the targeted caching server. In some embodiments, the process 300 is periodically performed to ensure that the updated DNS entries are not overwritten.

The process begins by updating (at 310) the cache of the targeted caching server. In some embodiments, a configuration of the targeted caching server specifies what content has been targeted for caching at the targeted caching server. The configuration may specify a set of hostnames, domain names, or IP addresses of the content providers that host the selected content. The process updates the cache by requesting the selected content from the specified content providers. The requested content is then received by the targeted caching server and is stored to cache memory. The process refreshes the cache as needed to ensure that the cached content is the most recent content. In some other embodiments, the configuration of the targeted caching server specifies a set of targeted hostnames or domain names. In some such embodiments, the targeted caching server monitors the content that passes from the specified set of targeted hostnames or domain names in order to determine the most relevant content for caching.

Next, the process generates (at 320) an update to send to one or more DNS servers of the carrier network. The update is a file that is used to modify the entries of the DNS servers. These modified entries cause the DNS servers to resolve a specified set of hostnames or domain names to an address that maps to the targeted caching server instead of to the source content providers. In some embodiments, the address maps to an Internet Protocol (IP) address of the targeted caching server. In some embodiments, the address maps to a virtual IP address of a load balancer that distributes loads over a set of targeted caching servers that includes the targeted caching server. In some such embodiments, each targeted caching server of the set of targeted caching servers caches the same content. The IP or virtual IP address may be an IPv4 or IPv6 address. The address may also map to a Canonical Name or CNAME that specifies an alias domain or hostname that is mapped to an IP or virtual IP address for the targeted caching server.

The process issues (at 330) the update to the carrier network DNS servers and the process ends. In some embodiments, the targeted caching server is configured with the addressing and other information (e.g., authentication information) necessary to issue the update to the carrier network DNS servers.

As noted above, the update may include an XML file, delimited file, or a DNS zone file. These files are formatted according to specifications of the DNS servers. In some embodiments, the XML file includes tagged entries for resolving various hostnames and domain names to IP addresses. The XML file or delimited file can be used to add new entries to, remove existing entries from, or overwrite existing entries of a DNS server. These files can be issued to the DNS server using one or different network protocols such as Transmission Control Protocol (TCP).

In some embodiments, the DNS zone file is a text file that includes mappings between hostnames and domain names to IP addresses. FIG. 4 illustrates entries of two DNS zone files 410 and 420 in accordance with some embodiments. The entries specify a mapping between hostnames for content providers whose content is cached at the targeted caching server and the IP address for the targeted caching server. Specifically, the hostnames 430 and 440 are mapped to the IP address 450 of the same targeted caching server. As shown, the two zone files 410 and 420 establish a many-to-one mapping whereby different hostnames and/or domain names for one or more content providers are mapped to the address of a single targeted caching server. The mapping may also specify a one-to-many or many-to-many mapping whereby a hostname or domain name for a particular content provider is mapped to the addresses of multiple targeted caching servers that each cache all or some of the content for that particular content provider. The mappings may also specify different load balanced virtual IP addresses that distribute loads over various targeted caching servers.

Using the XML or DNS zone files, carrier network administrators or caching service operators can be selective in what content each targeted caching server caches from a particular content provider. For example, a request for a particular YouTube.com website returns URL links to several embedded objects for that particular website. Rather than cache the content for all such embedded objects, the caching server can cache the content that consumes the largest portion of bandwidth. For example, some embedded objects may include dynamic advertisements, graphics, and text that consume little bandwidth and such content need not be cached. However, other heavy bandwidth consuming objects such as the videos hosted by the content provider may be cached in order to maximize intra-carrier network traffic. Also, caching time-sensitive content such as video streams improves the end user experience as the content is delivered from the targeted caching server that is closer to the carrier network end users than the source content provider. As a result, the content is delivered with less delay and fewer network errors. To perform such targeted caching, the targeted caching server is configured to cache the video stream object from the source content provider and the DNS entries of the carrier network DNS servers are modified to discretely map the domain or hostname that is used to access the video stream object to the address of the targeted caching server. Other domains or hostnames that supply the advertisements, graphics, text, and other embedded objects are left unchanged so that the end user continues to obtain this content from one or more source content providers.

Figure 5:
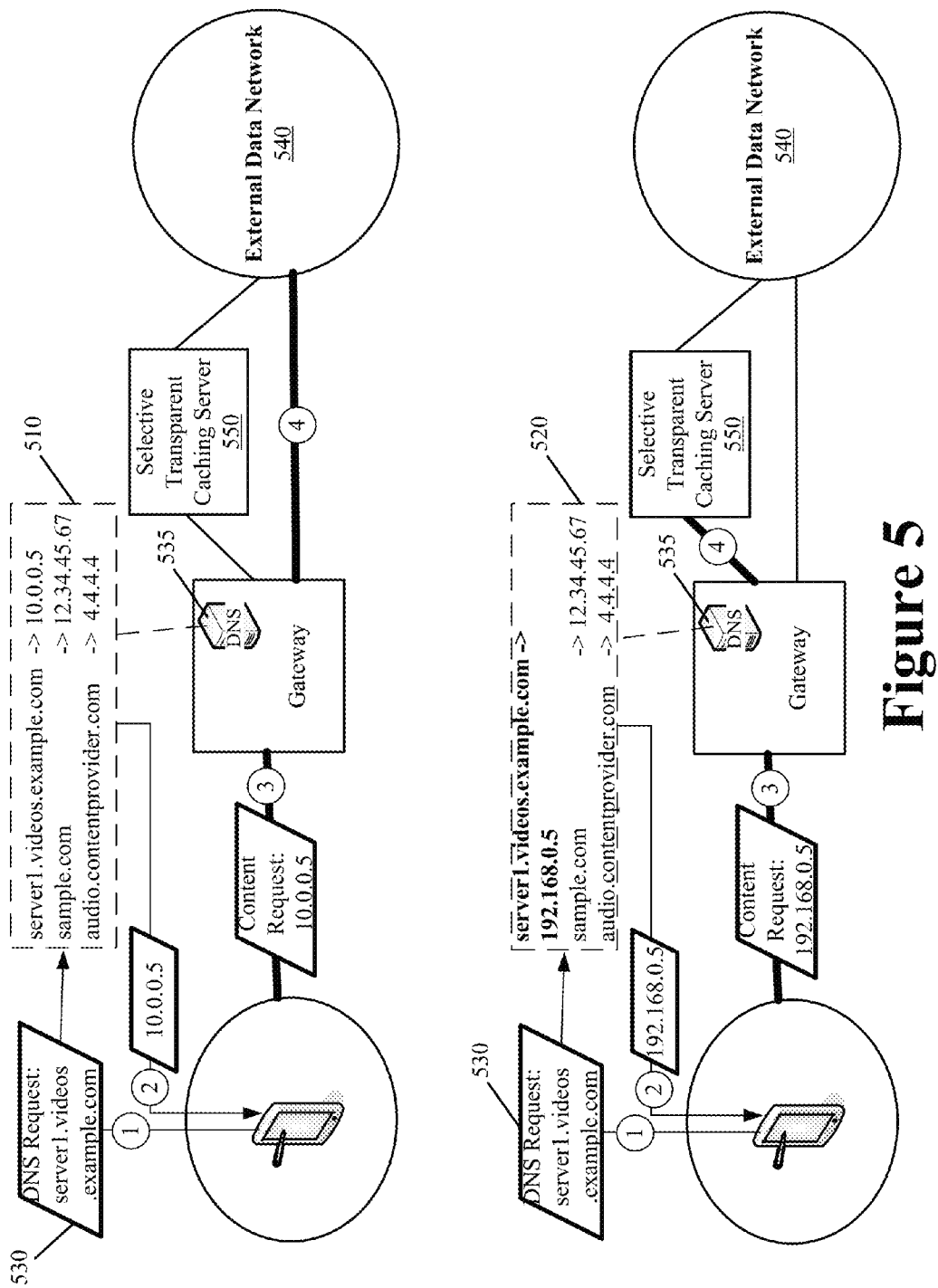
FIG. 5 illustrates using discrete mapping to facilitate targeted caching in accordance with some embodiments.

FIG. 5 illustrates using discrete mapping to facilitate targeted caching in accordance with some embodiments. Specifically, 510 illustrates DNS server entries prior to being updated by the targeted caching server generated feed. Accordingly, when an end user DNS request 530 for "server1.videos.example.com" is received at the DNS server 535, the DNS entries 510 are used to resolve the request and identify the IP address for a source content provider that is outside the carrier network. Upon receiving the source content provider IP address, the end user submits a content request to the identified content provider. The content request is routed through the external data network 540 to the content provider which then responds with the requested content that is passed from the external data network 540 back to the requesting end user.

520 illustrates the DNS server entries after they are updated by the targeted caching server generated feed. In this scenario, the same end user DNS request 530 is resolved to identify the IP address for the targeted caching server 550 of the carrier network. The end user then submits a content request to the identified targeted caching server 550. The caching server 550 responds by passing the requested content to the end user. Consequently, the content is delivered with less network delay and fewer network errors than when delivering the same content from the external data network.

Figure 6:
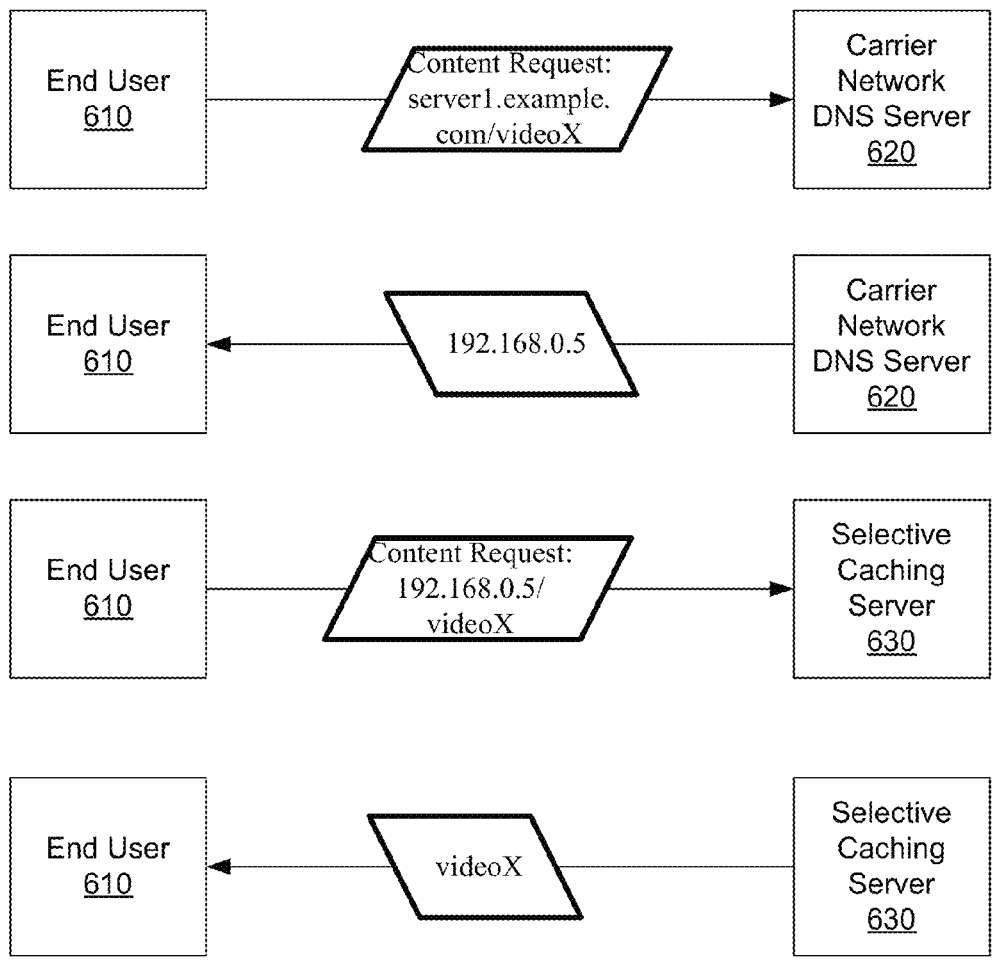
FIG. 6 illustrates a message exchange sequence for fulfilling an end user request using discrete mapping and targeted caching of some embodiments.

FIG. 6 illustrates a message exchange sequence for fulfilling an end user request using discrete mapping and targeted caching of some embodiments. The message exchange commences when a carrier network end user 610 submits a content request for "server1.example.com/videoX" to the carrier network. The content request is first passed to DNS server 620 of the carrier network in order to resolve the hostname server1.example.com to an IP address. In some embodiments, the DNS server 620 is a local DNS server of the carrier network, a recursive DNS server, or a DNS server that is not authoritative for the example.com domain. It is assumed in this figure that the requested content is cached at the targeted caching server and that the DNS entries of the DNS server 620 have been modified to discretely map requests for this hostname to the targeted caching server. Accordingly, the DNS server 620 responds to the request by providing the IP address "192.168.0.5" of the targeted caching server to the end user 610. In some embodiments, the IP address "192.168.0.5" is a virtual IP address for a load balancer that distributes loads across a set of targeted caching servers that cache the same targeted content. The end user 610 then submits the request with the resolved address "192.168.0.5/videoX" to the carrier network which routes to the targeted caching server 630. The targeted caching server 630 passes the requested videoX content to the end user 610.

In some embodiments, the discrete mapping can be used to restrict access to illicit, lewd, or other unapproved content. For example, during peak usage hours, the carrier network may wish to preserve resources for approved content and prevent resources from being used to deliver unapproved content. In such instances, the carrier network identifies hostnames and domains that contain the unapproved content. The DNS entries for those hostnames and domains are then updated to discretely map the requests to the targeted caching server. The targeted caching server provides an error page or redirects the request to an approved site, thereby preventing access to the restricted content.

B. DNS Assignment

In some embodiments, the DNS operation for the carrier network is modified by wholly assigning the DNS operation to a third party operator such as a caching service operator. In some such embodiments, the DNS requests that originate from the carrier network's service regions are resolved using DNS servers of the third party operator. In this manner, the third party operator can control the DNS operation for the carrier network and thereby perform DNS updates as needed. The DNS servers may still reside within the carrier network even though control over these servers is assigned to the third party operator.

In some embodiments, the carrier network partially assigns its DNS operation to the third party operator. In some such embodiments, the carrier network retains control over its DNS servers. The carrier network DNS servers are the local DNS servers that are first contacted by end user subscribers of the carrier network. However, for a specified set of hostnames and/or domains, the carrier network DNS servers forward the corresponding DNS requests to DNS servers of the third party operator that are used to resolve these requests. The specified set of hostnames and/or domains includes those hostnames or domains from which content has been cached at the targeted caching server. Other hostnames or domains not within the specified set of domains are resolved without forwarding the corresponding requests to the third party DNS servers. In this manner, the third party operator is provided control over a subset of domains that include domains of content providers whose content has been targeted for caching at a targeted caching server. Similarly, the third party operator is provided partial control over the set of hostnames for content providers whose content has been targeted for caching at a targeted caching server. The DNS servers of the third party operator may be located adjacent to the carrier network DNS servers.

The third party DNS servers can map requests either to the source content providers or the targeted caching servers. Such partial assignment of DNS operation is effective when targeted caching servers cache a subset of embedded objects for a particular content request. For example, when a content request specifies a URL to a YouTube website that accesses a particular video, the returned content includes a base page and URLs to several embedded objects that populate the remainder of the page. In some embodiments, the targeted caching server caches content for the embedded object that provides the particular video. Other embedded objects may include ancillary content such as advertisements, graphics, and text. Accordingly, the domain or hostname that is specified in the URL for the video embedded object is discretely mapped to the caching server and other URLs are mapped to the corresponding source content provider by recursively querying through the DNS hierarchy or by iterating through several DNS servers.

Figure 7:
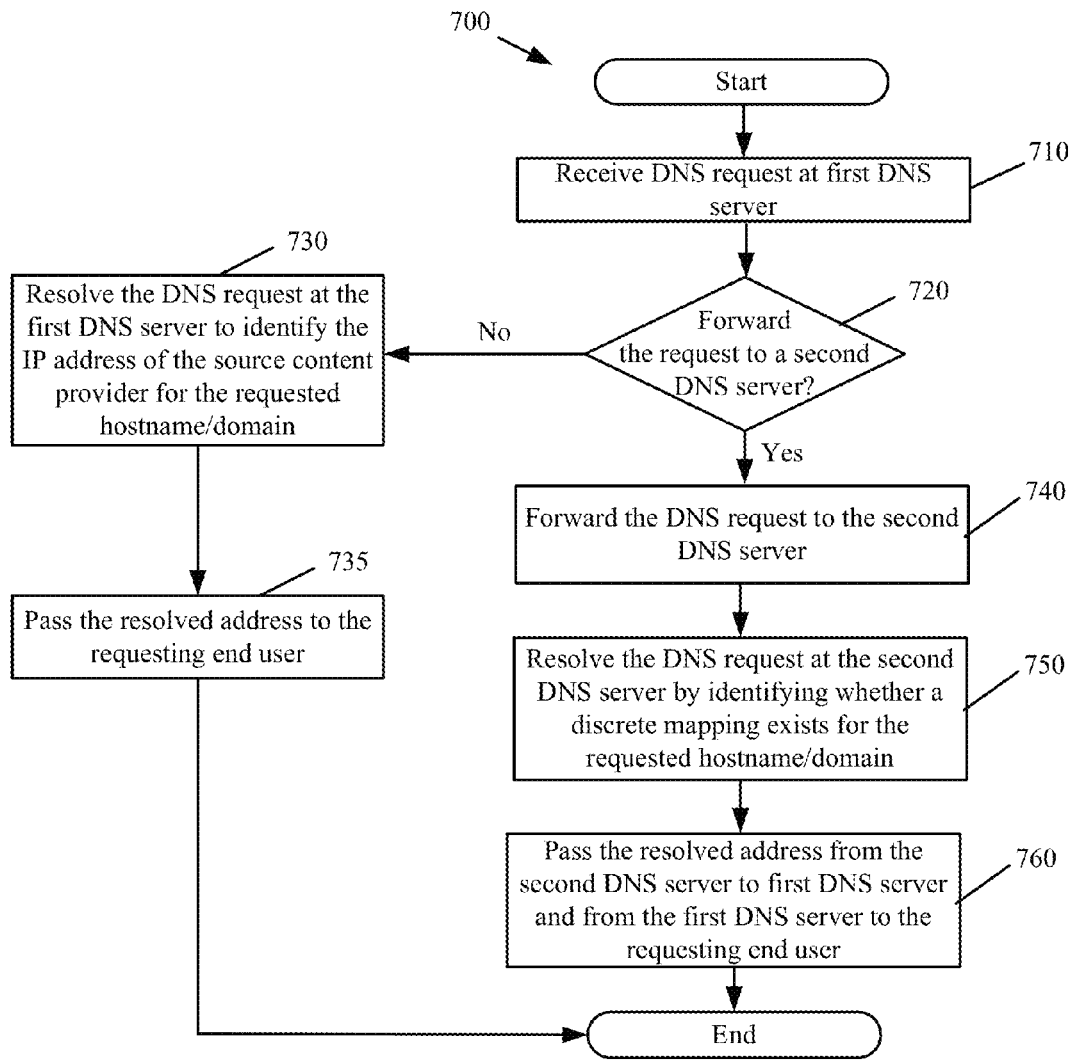
FIG. 7 presents a process for performing partial DNS assignment to facilitate targeted caching in a carrier network in accordance with some embodiments.

FIG. 7 presents a process 700 for performing partial DNS assignment to facilitate targeted caching in a carrier network in accordance with some embodiments. The process 700 begins when a DNS request is received (at 710) at a first DNS server. The first DNS server may include a DNS server of the carrier network. The process determines (at 720) whether to forward the request to a second DNS server by comparing the requested hostname in the DNS request with a configured set of hostnames. When the requested hostname is not within the set of hostnames, the process resolves (at 730) the DNS request at the first DNS server. The resolved request identifies the IP address of the source content provider for the requested hostname. It should be apparent that the first DNS server may iteratively or recursively contact other DNS servers to resolve the request. The resolved address is passed (at 735) to the requesting end user and the process ends.

When the requested hostname is within the set of hostname, the DNS request is forwarded (at 740) to the second DNS server. The second DNS server may include a DNS server of the third party operator (i.e., the caching service operator) that is assigned to manage requests for the set of hostnames. The process resolves (at 750) the DNS request at the second DNS server by identifying whether a discrete mapping to the targeted caching server exists for the particular requested hostname. If the discrete mapping exists, then content from the requested hostname is cached at the targeted caching server and the DNS request is resolved to identify the IP address for the caching server. The resolved address is passed (at 760) from the second DNS server to the first DNS server and then the first DNS server passes the resolved address to the requesting end user. Otherwise, the request is resolved by the first DNS server to identify the IP address of the source content provider for the requested hostname.

C. DNS Redirection

In some embodiments, DNS redirection is used to facilitate the discrete mapping of content requests to the targeted caching server. In some such embodiments, the DNS servers of the carrier network are configured to redirect DNS requests for a specified set of hostnames and domains to one or more DNS servers that are operated by the caching service operator. The specified set of hostnames and domains includes those hostnames and domains that are managed by the caching service operator and those hostnames and domains from which content may be cached at the targeted caching server.

Figure 8:
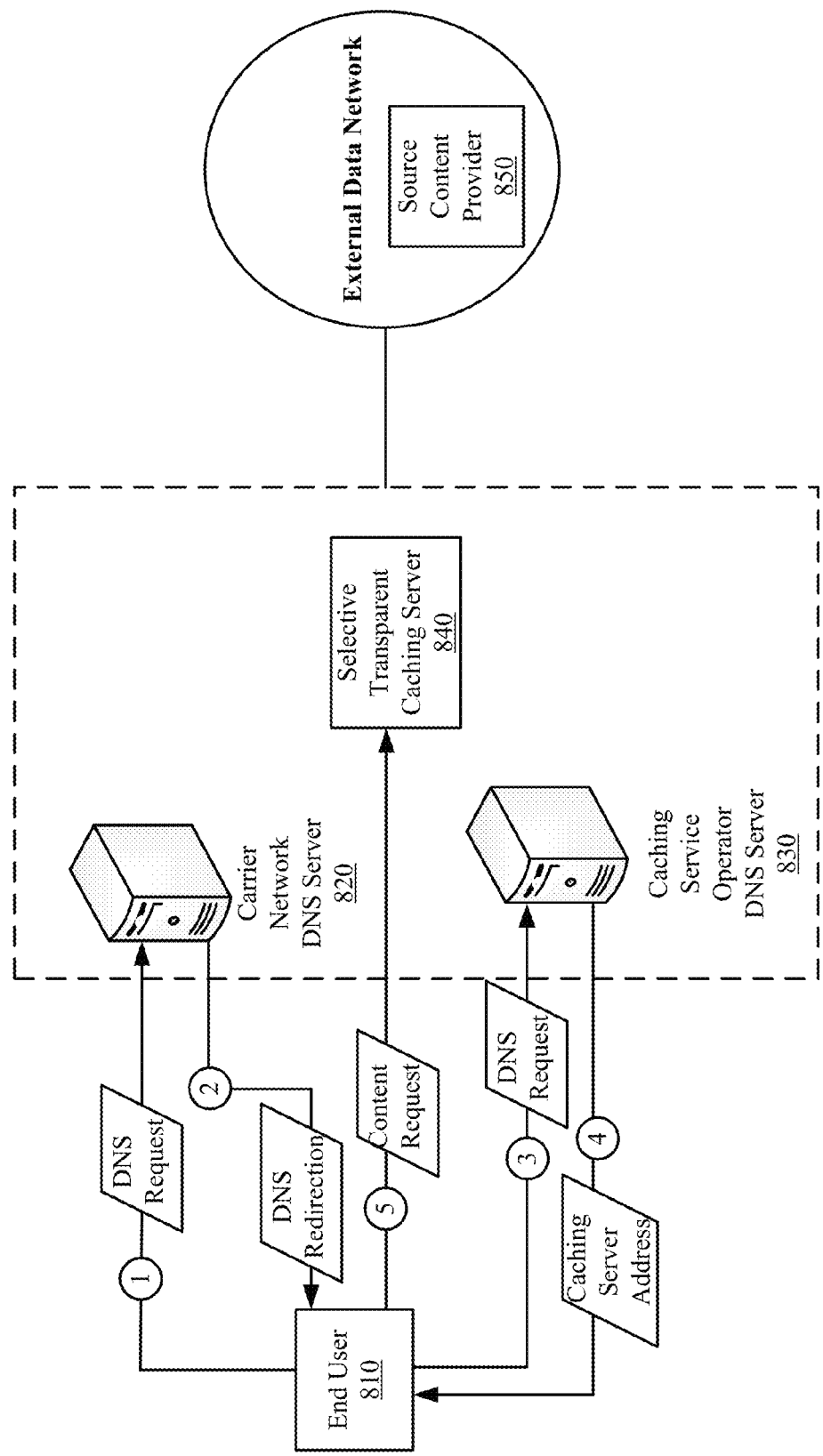
FIG. 8 illustrates using DNS redirection to facilitate targeted caching in a carrier network in accordance with some embodiments.

FIG. 8 illustrates using DNS redirection to facilitate targeted caching in a carrier network in accordance with some embodiments. The figure includes an end user 810, carrier network DNS server 820, caching service operator DNS server 830, targeted caching server 840, and source content provider 850. In this figure, the source content provider 850 is located in an external data network.

The end user 810 submits to the carrier network DNS server 820 a DNS request that identifies a particular hostname. In this figure, the targeted caching server 840 caches content for the particular hostname. Accordingly, the particular hostname is included within the specified set of hostname that are managed by the caching service operator. Therefore the carrier network DNS server 820 passes a DNS redirection message to the end user 810.

The DNS redirection message causes the end user 810 to resubmit the DNS request to the caching service operator DNS server 830. The caching service operator DNS server 830 is responsible for resolving DNS requests that identify a hostname of the specified set of hostname. In this figure, the caching server 840 has cached content for the particular hostname that is specified in the request. Accordingly, the DNS request is resolved to identify the IP address for the caching server 840 so that the end user 810 can then request the content from the caching server 840.

III. Targeted Caching Server

In some embodiments, targeted caching is implemented in a carrier network using one or more targeted caching servers. Each caching server provides cached content to one or more service regions of the carrier network. Each caching server may be located adjacent to the service regions that it provides content to. Each caching server may replicate content that is cached at other caching servers so that end users content requests are distributed across the caching servers. Additionally, each caching server may cache content that is unique to the content that is cached at the other caching servers.

The above described discrete mapping forwards end users to the caching servers instead of to the source content providers when the content of the content providers is cached at the caching servers. In so doing, the caching servers are able to deliver the requested content to the end users more efficiently than the source content providers because of the proximity of the caching servers to the end users. Moreover, by delivering the content from the caching servers, the cost to the carrier network is lowered. Specifically, traffic is localized within the carrier network and less bandwidth is used to access the external data networks.

The operation of the targeted caching servers of some embodiments differs from traditional transparent caching servers in that the targeted caching servers do not process end user content requests to determine whether the requested content is cached at the caching server. Any requests that are discretely mapped to the targeted caching servers are fulfilled by the caching servers. This reduces or altogether eliminates cache misses that occur with high regularity at typical transparent caching server implementations.

Furthermore, in some embodiments, the targeted caching servers do not process the content that passes from the source content providers to the carrier network in order to determine what content to cache and what content to purge from the cache. Instead, the targeted caching servers are configured to cache certain targeted content. In some other embodiments, the targeted caching servers process content that passes from a specified set of source content providers to the carrier network in order to determine what content to cache from the specified set of source content providers. In this manner, the targeted caching servers update their cache with the most relevant content from the specified set of content providers without having to process content from other source content providers not of the specified set of content providers. This greatly reduces the resource usage of the targeted caching servers. As a result, the targeted caching server can be implemented with fewer resources and with lower overall cost.

In some embodiments, the targeted content includes content from content providers that are certified by the carrier network or caching service operator. The targeted content may also include content that consumes the greatest amount of carrier network resources. Such content may include frequently accessed content or less frequently accessed content that consumes large amounts of bandwidth (e.g., video streaming). Content that is targeted for caching can be filtered so that the most resource intensive objects are cached. For example, a video streaming site will include other objects (e.g., advertisements, graphics, text, etc.) in addition to the video stream. Therefore, rather than cache all the objects for that site, the caching servers can cache the video stream and allow the remainder of the objects to be served from the source content provider.

In some embodiments, the targeted content includes content that best monetizes the caching resources. For example, the carrier network can charge content providers a fee to cache their content at the caching servers. In so doing, the carrier network receives monetary compensation, the content providers are able to transfer load from their servers to the caching servers, and the end users of the carrier network that access the content providers' content receive an improved user experience as the content is delivered with less delay.

In some embodiments, the targeted content is used to prevent access to the content of certain content providers. In some such embodiments, the caching servers store an error message or a page for redirecting end users. The targeted caching can therefore be used to implement parental controls for the carrier network and prevent access to illicit, lewd, or other content that the carrier network restricts.

IV. Server System

Many of the above-described processes and components are implemented as software processes that are specified as a set of instructions recorded on a non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer readable media include, but are not limited to, CD-ROMs, flash drives, RAM chips, hard drives, EPROMs, etc.

Figure 9:
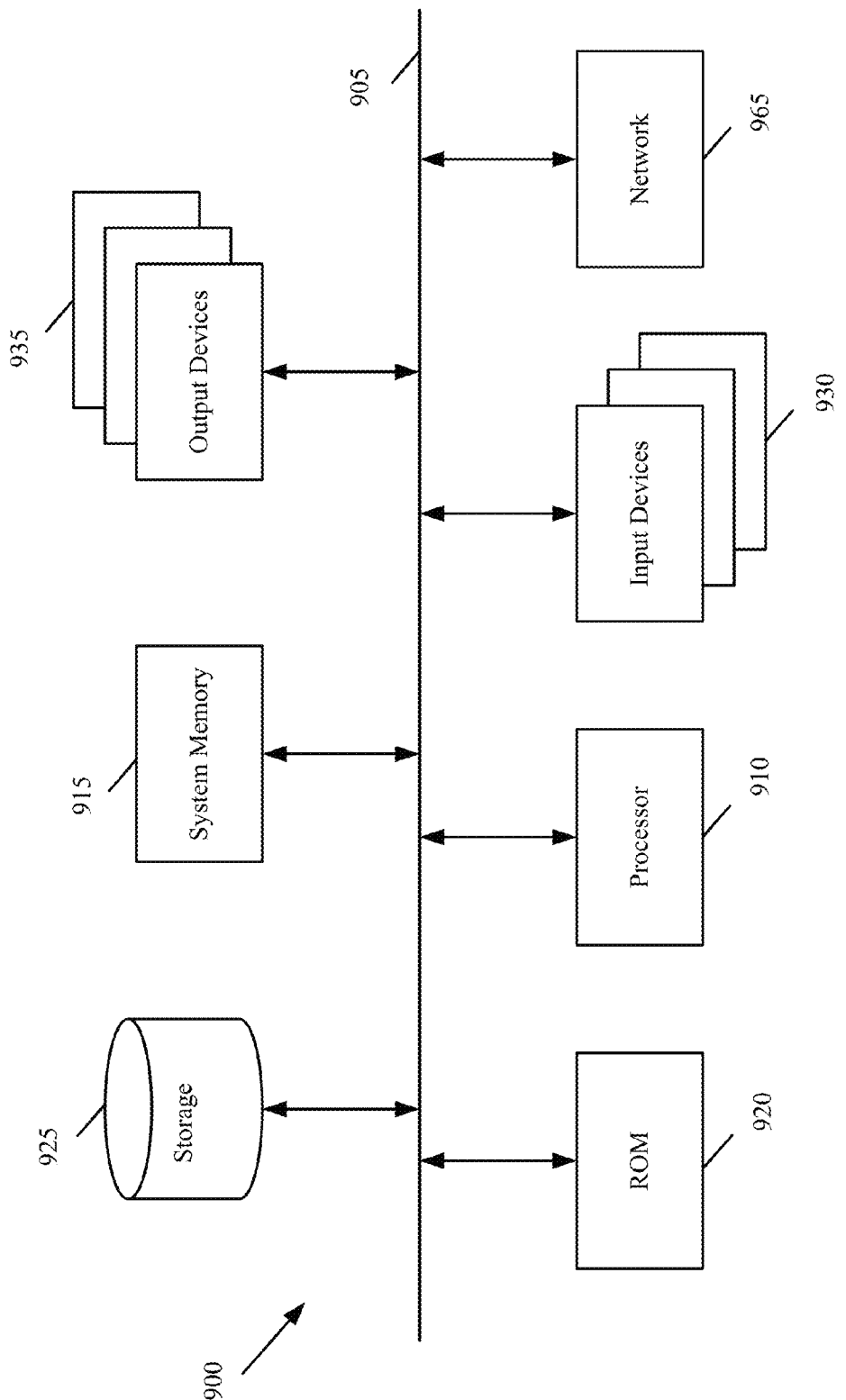
FIG. 9 illustrates a computer system or server with which some embodiments are implemented.

FIG. 9 illustrates a computer system or server with which some embodiments are implemented. Such a computer system includes various types of computer readable mediums and interfaces for various other types of computer readable mediums that implement the various processes and modules described above (e.g., targeted caching server, DNS servers, etc.). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device Like the permanent storage device 925, the system memory 915 is a read-and-write memory device. However, unlike storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keypads (including physical keyboards and touchscreen keyboards), pointing devices (also called "cursor control devices"). The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the internet.

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for providing localized content delivery for users gaining network access through a first data network, the first data network comprising (i) a caching server and (ii) a first Domain Name System (DNS) server for initiating resolution of DNS requests that originate from the users operating within the first data network, the computer-implemented method comprising:
   caching to the caching server, substitute content that is different than original content of a particular content provider operating within a different second data network, wherein content of the particular content provider is identified by a particular domain;
   modifying an entry of the first DNS server of the first data network based on said caching of the substitute content by the caching server, wherein said modifying reconfigures the first DNS server to resolve any request directed to the particular domain to the caching server without modifying a second DNS server that (i) is authoritative for the particular domain or (ii) operates outside the first data network;
   resolving a new request directed to the particular domain at the first DNS server based on the modified entry by identifying the caching server in response to the new request, said resolving occurring without reference to another DNS server including the second DNS server that is authoritative for the particular domain; and
   passing the substitute content from the caching server in response to the new request.

2. The computer-implemented method of claim 1, wherein the original content is hosted by a server of the particular content provider operating in the second data network that is outside the first data network.

3. The computer-implemented method of claim 1, wherein the first DNS server comprises at least one of a recursive DNS server, a local DNS server of the first data network, and a DNS server that is not authoritative for the particular domain.

4. The computer-implemented method of claim 1 further comprising identifying that the original content of the particular content provider is subject to a restriction that prevents delivery of the original content to the users of the first data network.

5. The computer-implemented method of claim 1 further comprising determining to reduce traffic flows between the first data network and the second data network.

6. The computer-implemented method of claim 1, wherein the new request originates from a user operating from within the first data network.

7. The computer-implemented method of claim 1, wherein modifying operation of the first DNS server comprises introducing a CNAME into the first DNS server's configuration, and wherein the CNAME provides an alias for the particular domain with the alias resolving to an IP address of the caching server.

8. The computer-implemented method of claim 1, wherein resolving the new request comprises providing an IP address of the caching server in response to the new request.

9. The computer-implemented method of claim 1, wherein resolving the new request comprises further comprising passing from the first DNS server, an IP address of the caching server in response to the new request.

10. The computer-implemented method of claim 1, wherein resolving the new request comprises further comprising passing from the first DNS server, a DNS response with a CNAME in response to the new request, wherein the CNAME comprises an alias that resolves to an IP address of the caching server.

11. The computer-implemented method of claim 1 further comprising determining that the original content is restricted by the first data network.

12. The computer-implemented method of claim 1 further comprising determining that the original content is subject to network errors when delivered.

13. A first data network comprising:
   a caching server comprising a processor and memory, the memory caching substitute content that is different than original content of a particular content provider operating within a different second data network, wherein content of the particular content provider is identified by a particular domain;
   a first Domain Name System (DNS) server for initiating resolution of DNS requests that originate from users operating within the first data network, the first DNS server:
   modifying a first DNS entry based on said caching of the substitute content by the caching server, wherein said modifying reconfigures the first DNS server to resolve any request directed to the particular domain to the caching server without modification of a second DNS server that (i) is authoritative for the particular domain or (ii) operates outside the first data network; and
   resolving a new request directed to the particular domain based on the first DNS entry by identifying the caching server in response to the new request, said resolving occurring without reference to another DNS server including the second DNS server that is authoritative for the particular domain, and wherein the caching server passes the substitute content in response to the new request.

14. A computer system operating within a first data network, the computer system comprising:

memory caching substitute content that is different than original content of a particular content provider operating within a different second data network, wherein content of the particular content provider is identified by a particular domain;

at least one hardware processor (i) modifying first data network Domain Name System (DNS) entry based on said caching of the substitute content, wherein said modifying reconfigures the first data network DNS entry to resolve any request directed to the particular domain without modification of a second DNS server that is authoritative for the particular domain or operates outside the first data network, and (ii) resolving a new request directed to the particular domain based on the first data network DNS entry without reference to another DNS server including the second DNS server that is authoritative for the particular domain; and at least one network interface passing the substitute content from the memory in response to the new request.

* * * * *